Aug. 22, 1944.  A. H. MAUDE ET AL  2,356,334
MEANS FOR STORING AND CONCENTRATING ANHYDROUS HYDROGEN CHLORIDE
Filed Dec. 18, 1941
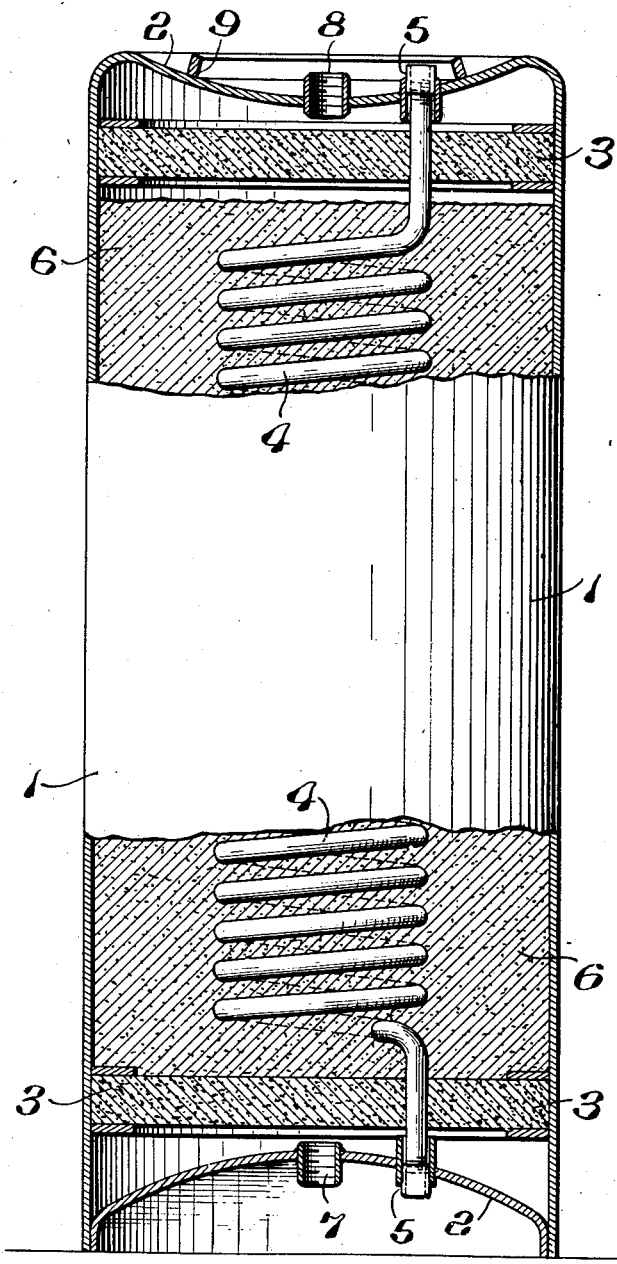
INVENTOR
Aylmer H. Maude
BY David D. Rosenbury
Kenneth A. Stuart
ATTORNEY Patented Aug. 22, 1944

2,356,334

UNITED STATES PATENT OFFICE 2,356,334

MEANS FOR STORING AND CONCENTRATING ANHYDROUS HYDROGEN CHLORIDE

Aylmer H. Maude and David S. Rosenberg, Niagara Falls, N. Y., assignors to Hooker Electrochemical Company, Niagara Falls, N. Y., a corporation of New York Application December 18, 1941, Serial No. 423,445

5 Claims. (Cl. 23—252)

It is known that certain materials form addition compounds with anhydrous hydrogen chloride and that the hydrogen chloride may be subsequently recovered for use as required by application of heat to the compound. Among the materials known to form such addition compounds are certain salts of heavy metals, such as cupric chloride, copper, lead, cadmium, silver, mercury, tin, bismuth and antimony sulphate, phosphate, phosphite and hypophosphite and thallium and ferric phosphate. Many of these salts are heavy or expensive or give off the HCl at an inconveniently high temperature. Copper, lead and stannous sulphates form the stable addition compounds $CuSO_4.2HCl$, $PbSO_4.2HCl$ and $SnSO_4.1.5HCl$. The temperatures at which these compounds begin to give off HCl depend upon the degree of saturation, but at atmospheric pressure, and in an atmosphere of HCl, they will be found to have given off most of the HCl at 100° C. These salts are therefore at present among the preferred salts for our purpose.

However, these salts when dehydrated are generally powdery and hygroscopic. Carrying out the absorption and desorption therefore involves considerable difficulty. In U. S. Patent No. 2,234,738 there is disclosed a method and apparatus for overcoming these difficulties, which comprises impregnating inert porous granular material, or plastic material, with an aqueous solution of the salt, and then driving off the water, so as to leave the salt distributed throughout the material. The material thus impregnated is enclosed in an air tight container, thus excluding moisture. In the patent, the materials mentioned are "Alfrax," "Alundum," pumice and clay. The first two of these materials are commercial forms of aluminum oxide. The last two are mixtures of silicates, largely of aluminum. All four of these materials, therefore, contain aluminum. In the patent it is stated that these materials last indefinitely. However, with further experience it has been found that the aluminum slowly chlorinates and after repeated use for prolonged periods the absorptive mass tends to deteriorate and lose its capacity to absorb hydrogen chloride and re-evolve it with high efficiency.

We have now found that the dehydrated salt may be quite conveniently used for absorption and desorption of HCl in powdered form, provided it be enclosed between finely porous walls, such as porous plates of silicon dioxide, in an air tight container.

When the salt is copper sulphate, we have found that the salt will be in a form presenting the maximum porosity and activity if it is dehydrated at not less than 400° C. and preferably at 425° C., and no longer than just sufficient to dehydrate the mass. If heated to 475° C. the activity of the salt diminishes and at 650° C. the salt decomposes.

In the drawing we have illustrated one type of container suitable for our purpose.

Referring to the drawing:

1 is the container shell, preferably of steel, partly cut away at each end to disclose the interior construction. The shell 1 is closed by ends 2, 2. 3, 3 are false ends or partitions inside of ends 2, 2, preferably of silicon dioxide fused into the form of porous plates, as sold under the trade name "Filtros." 4 is an internal pipe coil for cooling or heating, with its ends extending through openings in partitions 3, 3. The ends of pipe 4 also extend through end walls 2, 2 and are preferably welded therein at 5, 5. 6 is the mass of powdery or granular absorptive material. In the drawing, mass 6, where it is disclosed by the cutting away of shell 1, is in section, better to disclose coil 4. 7 and 8 are the connections for charging and discharging the unit respectively. 9 is a band welded to one end for hoisting. The space between the true ends 2, 2 and the false ends or partitions 3, 3 provides clearance by means of which gas can pass to and from the charging and discharging openings from every part of the porous partitions. The ends of the container are preferably dished inwardly in order to provide recesses in which valves or plugs (not shown) for closing the openings into the container may be housed without danger of their being knocked off in handling.

If preferred, and in particular when the absorptive material is in granular form and the hydrogen chloride in high concentration, one of the permeable partitions and the corresponding pipe connection may be dispensed with. In that case, the gas is fed in and withdrawn through the same pipe connection.

When the absorptive material is in powdered form, the container should preferably be filled not quite full with the material, as illustrated in the drawing. In charging, the container should then be placed in such a position that the material will be supported upon one of the porous partitions, and the gas admitted below this partition. In this way, the powdery material will be lifted away from the partition by the gas, whereas it would otherwise be forced against the partition and tend to obstruct its pores. For the same reason, in discharging, the gas should be drawn off through the upper partition. This method of contacting the gas with the absorptive material is useful wherever powdery material is to be contacted with gases reacting therewith.

In co-pending application Serial No. 423,444, filed simultaneously herewith, there is disclosed a method of using the salts by impregnating infusorial earth therewith. It is therein stated that the impregnated mass may be in powdered form or it may be granulated by means of an inert binder, such as sodium silicate. The resulting mass being largely composed of silica is unaffected by the hydrogen chloride for a longer period than the aluminum bearing materials of the patent above referred to. The impregnated infusorial earth prepared in accordance with this co-pending application may be used in powdered form in the container of the present invention.

Our container may be used for storing or shipping anhydrous hydrogen chloride, or it may be used for concentrating hydrogen chloride, by absorption out of its mixtures with diluent gases, such as air. In the latter case, the diluent gases pass through the adsorbent material and out the exit.

In general, when the container is to be used for shipment, we prefer to use the absorptive material in powdered form. In that form, it requires a longer time for charging, but for purposes of supplement that is a secondary consideration. A more important consideration is the fact that in powdered form it takes up a greater weight of hydrogen chloride for a container of given volume. When the container is to be used for concentrating dilute hydrogen chloride, on the other hand, times of charging and discharging are important and since the absorptive material is more permeable in granular form, we prefer to use it in that form. In that case, the dilute gas is fed through the mass of granular material and the diluent gases pass out at the other side or end.

The charging and discharging of the container may be facilitated by the use of pressure, as disclosed and claimed in co-pending application Serial No. 423,446, filed simultaneously herewith. Such use of pressure is particularly effective if the material is in granular form. Although we have illustrated a coil as the heat transfer means for cooling the material during charging and heating it during discharging, we do not wish to be limited thereto, as the container, if of small diameter, may be cooled or heated through its outer wall; or, if of large diameter, it may be cooled or heated by means of a more elaborate system of heat transfer surfaces.

In the claims, by "finely porous material" is meant a material of a porosity capable of retaining a finely divided material, a part or the whole of which may be a powder.

We claim as our invention:

1. A container for anhydrous hydrogen chloride comprising a gas tight metal shell, a rigid permeable plate of finely porous material constituting an inner retaining wall within said shell and defining with an end thereof a vestibule, a pipe connection extending through said shell and communicating with said vestibule, the space within said shell, exclusive of vestibule, containing an anhydrous finely divided material forming with anhydrous hydrogen chloride an addition compound decomposable by heat to liberate the hydrogen chloride, said finely divided material being in quantity allowing space for lifting and spreading of its particles under the action of gases entering from below.

2. A container for anhydrous hydrogen chloride comprising a gas tight metal shell, rigid permeable plates of finely porous material constituting inner retaining walls within said shell at opposite ends thereof and defining with said shell inlet and outlet compartments, pipe connections extending through said shell and communicating with said compartments, the space within said shell between said retaining walls containing an anhydrous finely divided material forming with anhydrous hydrogen chloride an addition compound decomposable by heat to liberate the hydrogen chloride, said finely divided material being in quantity allowing space for lifting and spreading of its particles under the action of gases entering from below.

3. A container for anhydrous hydrogen chloride comprising a gas tight metal shell, a rigid permeable plate of finely porous silicon dioxide constituting an inner retaining wall within said shell and defining with an end thereof a vestibule, a pipe connection extending through said shell and communicating with said vestibule, the space within said shell, exclusive of vestibule, containing an anhydrous finely divided material forming with anhydrous hydrogen chloride an addition compound decomposable by heat to liberate the hydrogen chloride, said finely divided material being in quantity allowing space for lifting and spreading of its particles under the action of gases entering from below.

4. A container for anhydrous chloride comprising a gas tight metal shell, rigid permeable plates of finely porous material constituting inner retaining walls within said shell at opposite ends thereof and defining with said shell inlet and outlet compartments, pipe connections extending through said shell and communicating with said compartments, the space within said shell between said retaining walls containing copper sulphate in the physical state resulting from dehydration of the crystalline copper sulphate at substantially 425° C., said copper sulphate being in quantity allowing space for lifting and spreading of its particles under the action of gases entering from below.

5. A container as claimed in claim 1 in combination with an interior heat transfer chamber and a pipe connection extending through said permeable plate and communicating with the same.

AYLMER H. MAUDE.
DAVID S. ROSENBERG.